US009769183B2

(12) United States Patent
Kanematsu et al.

(10) Patent No.: US 9,769,183 B2
(45) Date of Patent: Sep. 19, 2017

(54) INFORMATION PROCESSING APPARATUS, INFORMATION PROCESSING SYSTEM, AND IMAGE PROCESSING METHOD

(71) Applicants: Shoichiro Kanematsu, Kanagawa (JP); Kiyoshi Kasatani, Kanagawa (JP)

(72) Inventors: Shoichiro Kanematsu, Kanagawa (JP); Kiyoshi Kasatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/202,927

(22) Filed: Jul. 6, 2016

(65) Prior Publication Data
US 2017/0019630 A1    Jan. 19, 2017

(30) Foreign Application Priority Data

Jul. 14, 2015  (JP) ................................ 2015-140276
Jun. 9, 2016   (JP) ................................ 2016-115652

(51) Int. Cl.
| | |
|---|---|
| H04N 7/14 | (2006.01) |
| H04L 29/06 | (2006.01) |
| H04N 7/15 | (2006.01) |
| H04W 4/00 | (2009.01) |
| H04M 3/56 | (2006.01) |

(52) U.S. Cl.
CPC .......... *H04L 63/126* (2013.01); *H04L 65/403* (2013.01); *H04M 3/567* (2013.01); *H04N 7/15* (2013.01); *H04W 4/008* (2013.01)

(58) Field of Classification Search
CPC ....................................................... H04N 7/14
USPC .......... 348/14.01, 14.02, 14.03, 14.05, 14.04
See application file for complete search history.

(56) References Cited

U.S. PATENT DOCUMENTS

| | | | |
|---|---|---|---|
| 8,194,835 B1* | 6/2012 | Martin .................... | H04W 4/16 379/142.12 |
| 2007/0202807 A1* | 8/2007 | Kim ...................... | H04B 5/0062 455/41.2 |
| 2009/0240814 A1* | 9/2009 | Brubacher ............ | H04W 12/04 709/227 |
| 2012/0015604 A1* | 1/2012 | Abratowski ........ | H04M 1/7253 455/41.2 |
| 2013/0237155 A1* | 9/2013 | Kim ...................... | H04W 12/06 455/41.2 |
| 2015/0054968 A1 | 2/2015 | Murata | |
| 2015/0332037 A1* | 11/2015 | Tse .......................... | G06F 21/36 726/19 |
| 2016/0048368 A1* | 2/2016 | McGibney ............ | G06F 3/1454 345/2.3 |
| 2016/0338120 A1* | 11/2016 | Boyle ................. | H04L 65/1069 |

FOREIGN PATENT DOCUMENTS

| | | |
|---|---|---|
| JP | 2015-022724 | 2/2015 |
| JP | 2015-041373 | 3/2015 |

* cited by examiner

*Primary Examiner* — Olisa Anwah
(74) *Attorney, Agent, or Firm* — Oblon, McClelland, Maier & Neustadt, L.L.P.

(57) ABSTRACT

An information processing apparatus includes a first communication circuit that communicates with a memory that stores address information of an image processing apparatus, circuitry that reads the address information of the image processing apparatus from the memory, and a second communication circuit that exchanges data with the image processing apparatus identified with the address information read from the memory through a communication network.

5 Claims, 9 Drawing Sheets

INFORMATION PROCESSING APPARATUS, INFORMATION PROCESSING SYSTEM, AND IMAGE PROCESSING METHOD

CROSS-REFERENCE TO RELATED APPLICATIONS

This patent application is based on and claims priority pursuant to 35 U.S.C. §119(a) to Japanese Patent Applications No. 2015-140276, filed on Jul. 14, 2015 and No. 2016-115652, filed on Jun. 9, 2016 in the Japan Patent Office, the entire disclosures of which are hereby incorporated by reference herein.

BACKGROUND

Technical Field

The present invention relates to an information processing apparatus, an information processing system, and an information processing method.

Background Art

The recent systems provide multiple information processing apparatuses, which are connected with each other via networks such as cloud networks, to share images displayed on a large screen display. For example, at conferences in corporations, educational institutions, and government institutions etc., electronic whiteboards may be used, which allow users to draw stroke images such as texts, numbers, and figures etc. on background images. A technology that connects the electronic whiteboards to on-premise private cloud services that are owned by the corporations etc. and operated using the corporations' facility, and displays files exchanged with terminals on the electronic whiteboards is known.

In the information sharing system including the electronic whiteboard, a display sharing apparatus with a display capability and a communication capability, and a terminal device with an image capture capability and a communication capability are provided. The system further includes a connection apparatus having a communication capability to communicate with the display sharing apparatus and the terminal device, an authentication capability, a configuration capability, and a control capability.

SUMMARY

Example embodiments of the present invention provide a novel information processing apparatus that includes a first communication circuit that communicates with a memory that stores address information of an image processing apparatus, circuitry that reads the address information of the image processing apparatus from the memory, and a second communication circuit that exchanges data with the image processing apparatus identified with the address information read from the memory through a communication network.

Further embodiments of the present invention provide an information processing system, and an information processing method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
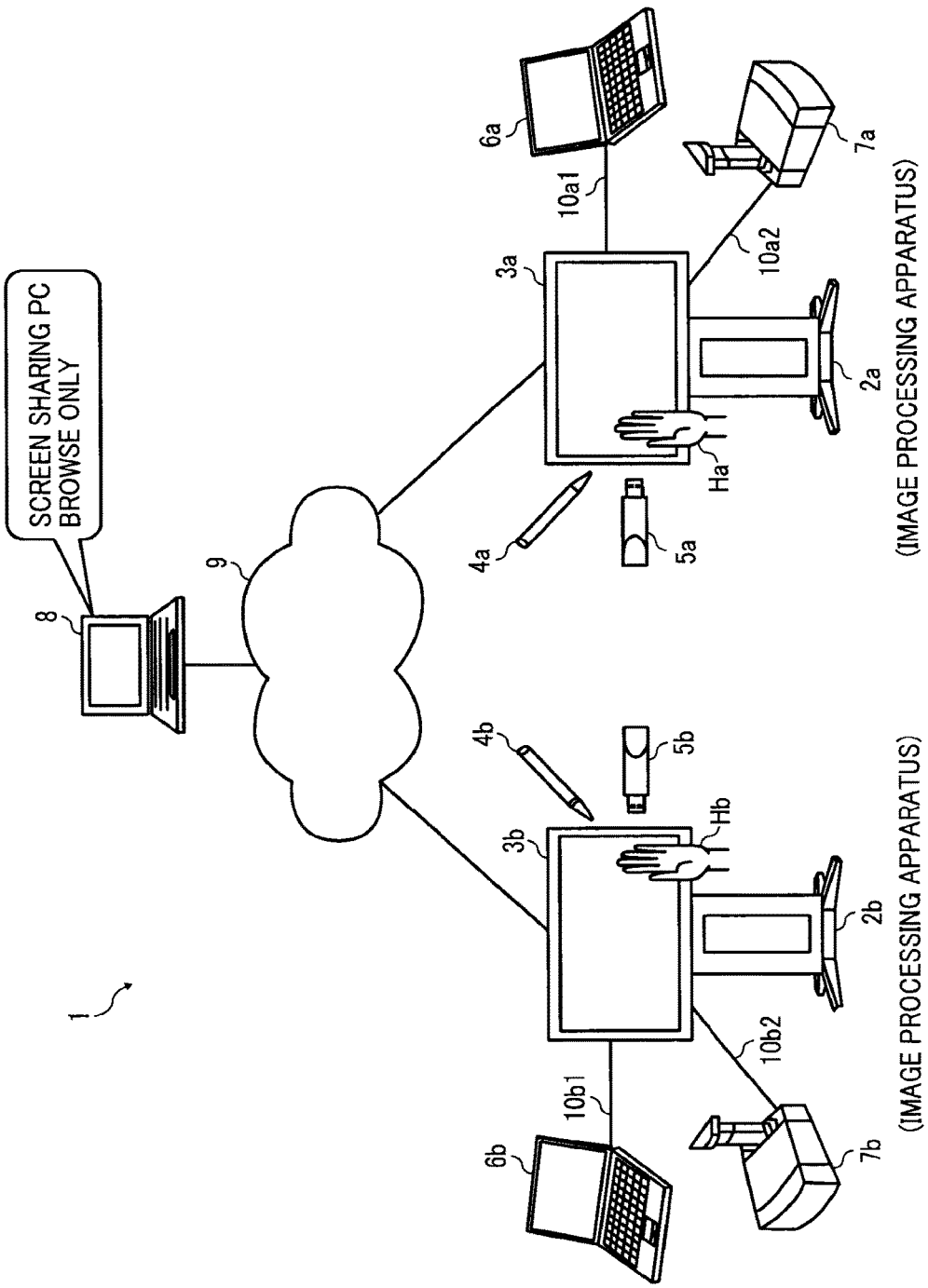
FIG. 1 is a diagram illustrating an entire configuration of an information processing system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In the embodiments described below, an information processing apparatus that can easily perform preparation before the user starts to exchange files with the electronic whiteboard is provided. In the embodiments described below, the NFC is taken as an example as a short-distance wireless communication technology. However, the present invention can be applied to a general short-distance wireless communication technology so-called RFID.

In this embodiment, in order to exchange predetermined data between the mobile device as an another apparatus and the electronic whiteboard, a predetermined application program to operate an information processing apparatus such as a multifunction peripheral (MFP) using the mobile device is used. Subsequently, address information such as an IP address of the electronic whiteboard that exchanges a predetermined data file with the mobile device is written in a NFC tag preliminarily. Furthermore, after launching the application program described above, the tag information of NFC is read using the mobile device.

Through the above-described operation, the user at the mobile device is registered to the electronic whiteboard. Furthermore, if security is configured in exchanging predetermined data between the mobile device and the electronic whiteboard, a pass code (authentication code) is displayed on the electronic whiteboard by accessing the electronic whiteboard using the mobile device. By inputting the pass code in the mobile device, it is possible to display the predetermined data transferred by the mobile device on the electronic whiteboard and display a file displayed on the electronic whiteboard on the mobile device by receiving the file.

That is, by reading the tag information of NFC that the address information of the electronic whiteboard is written, using the mobile device installed with the predetermined application program for operating the information processing apparatus, it is possible to omit preparation such as user registration or scan of the authentication code etc. The embodiments of the present invention are described below in detail with reference to figures.

First, an entire configuration of an information processing system as an embodiment is described below. FIG. 1 is a diagram illustrating an entire configuration of an information processing system of this embodiment. In FIG. 1, only two electronic whiteboards 2a and 2b and two electronic styluses 4a and 4b etc. are illustrated to simply the description. However, it is possible to use three or more electronic whiteboards and electronic styluses etc. The electronic whiteboards 2a and 2b are examples of the image processing apparatus.

As shown in FIG. 1, an image processing system 1 includes multiple electronic whiteboards 2a and 2b, multiple electronic styluses 4a and 4b, Universal Serial Bus (USB) memories 5a and 5b, notebook personal computers (PCs) 6a and 6b, videoconference terminals 7a and 7b, and a PC 8. The electronic whiteboards 2a and 2b and the PC 8 are connected to be communicable with each other via a communication network 9. Furthermore, the multiple electronic whiteboards 2a and 2b respectively include displays 3a and 3b. It should be noted that the PC 8 is a PC for sharing a screen in the image processing system 1 and functions as a monitor to be browsed.

In addition, the electronic whiteboard 2a can display an image drawn by an event generated by the electronic stylus 4a (e.g., the pen tip or the bottom of the electronic stylus 4a touches the display 3a) on the display 3a. It should be noted that it is also possible to modify the image displayed on the display 3a based on an event generated by a user hand Ha etc. (e.g., gestures that scales and flips a page etc.). The electronic styluses 4a and 4b and hands Ha and Hb are examples of pointing devices.

In addition, the USB memory 5a is connected to the electronic whiteboard 2a detachably. The electronic whiteboard 2a can read electronic files such as Portable Document Format (PDF) etc. from the USB memory 5a and store the electronic files in the USB memory 5a. In addition, the notebook PC 6a is connected to the electronic whiteboard 2a via the cable 10a1. The cable 10a1 is communicable using communication in compliance with the Specification such as DisplayPort and Digital Visual Interface (DVI) etc. In addition, the cable 10a1 is communicable using communication in compliance with the Specification such as High Definition Multimedia Interface (HDMI) and Video Graphics Array (VGA) etc.

On the electronic whiteboard 2a, an event is generated by touching the display 3a, and event information indicating the event is transferred to the notebook PC 6a just like an event of input devices such as a mouse and a keyboard etc. On the other hand, the videoconference terminal 7a is connected to the electronic whiteboard 2a via the cable 10a2 to be communicable using the specifications described above. It should be noted that it is also possible that the notebook PC 6a and the videoconference terminal 7a communicate with the electronic whiteboard 2a using wireless communication compatible with various wireless communication protocols such as Bluetooth etc.

On the other hand, at another site where the electronic whiteboard 2b is located, just like the case described above, the electronic whiteboard 2b including the display 3b, the electronic stylus 4b, the USB memory 5b, the notebook PC 6b, the videoconference terminal 7b, and the cables 10b1 and 10b2 are used. Furthermore, it is possible to modify an image displayed on the display 3b based on an event generated by the user hand Hb etc.

As a result, the image drawn on the display 3a of the electronic whiteboard 2a at one site is also displayed on the display 3b of the electronic whiteboard 2b at the other site. By contrast, the image drawn on the display 3b of the electronic whiteboard 2b at the other site is also displayed on the display 3a of the electronic whiteboard 2a at one site. As described above, in the image processing system 1, since it is possible to share the same image between remote sites, it is convenient to use the image processing system 1 for the remote videoconference etc.

In the below description, any one electronic whiteboard among multiple electronic whiteboards is referred to as the electronic whiteboard 2. Likewise, any one display among multiple displays is referred to as the display 3. Any one electronic stylus among multiple electronic styluses is referred to as the electronic stylus 4.

Any one USB memory among multiple USB memories is referred to as the USB memory 5. Any one notebook PC among multiple notebook PCs is referred to as the notebook PC 6. Any one videoconference terminal among multiple videoconference terminal is referred to as the videoconference terminal 7. Furthermore, any one hand among multiple user hands is referred to as the hand H. Any one cable among multiple cables is referred to as the cable 10.

In this embodiment, the electronic whiteboard 2 is described as an example of the image processing apparatus 2. However, the image processing apparatus is not limited to the electronic whiteboard 2. Other examples of the image processing apparatus are an electronic billboard (digital signage), a telestrator used in sports programs and weather reports etc., and telemedicine terminals etc.

In addition, the notebook PC 6 is described as an example of the information processing terminal in this embodiment. However, the information processing terminal is not limited to the notebook PC 6. Other examples of the information processing terminals are terminals that can provide image frames such as a desktop PC, a tablet PC, a smartphone, a personal data assistance (PDA), a digital video camera, a digital camera, and a video-game console etc.

Furthermore, the Internet, Local Area Network (LAN), and cell phone communication network etc. are examples of the communication network 9. In this embodiment, the USB memory 5 is described as an example of the recording medium. However, the recording medium is not limited to the USB memory 5. Other examples of the recording medium are various recording media such as a Secure Digital (SD) card etc.

Figure 2:
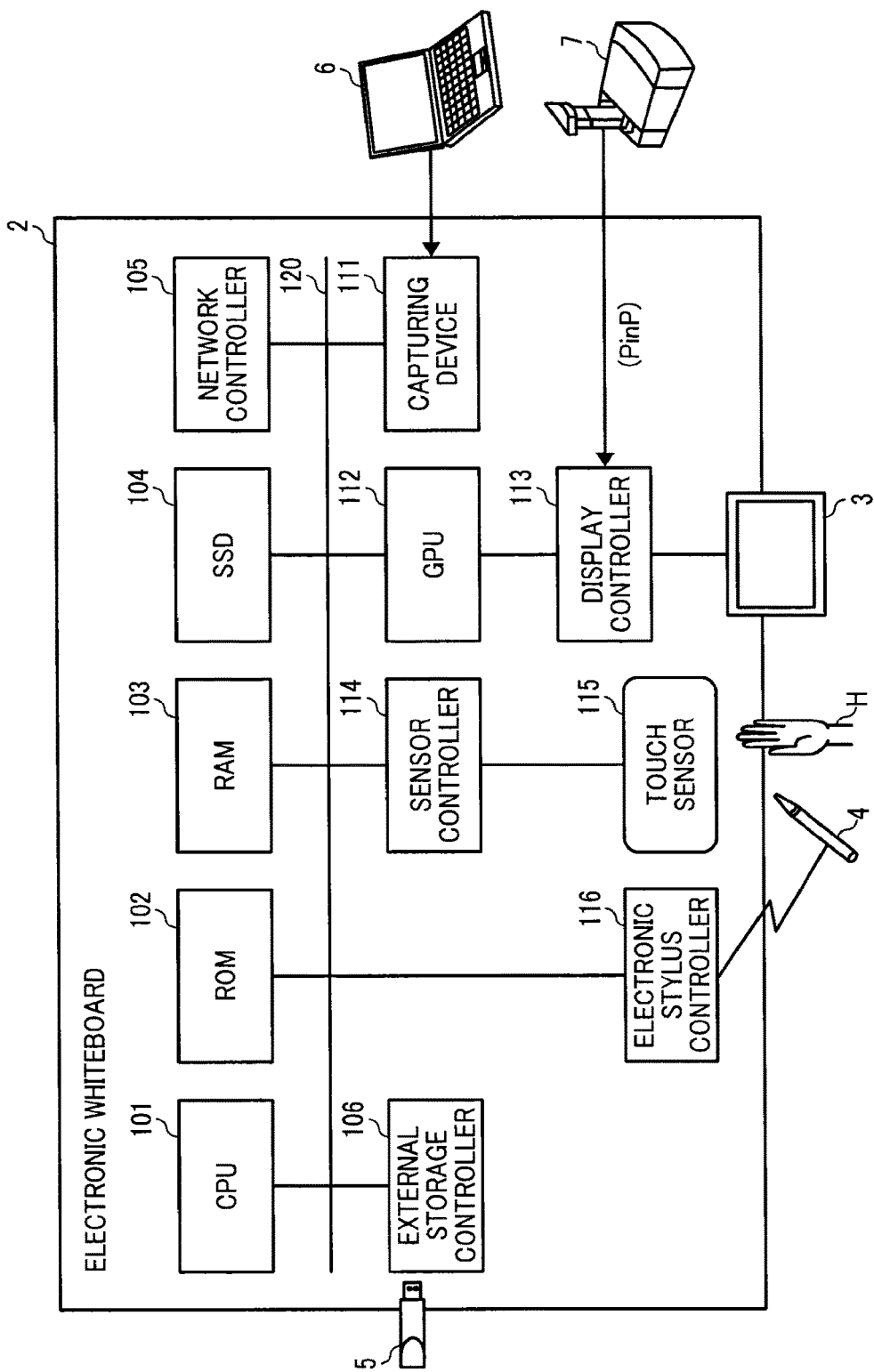
FIG. 2 is a diagram illustrating a hardware configuration of an electronic whiteboard included in the information processing system as an embodiment of the present invention.

Next, a hardware configuration of an electronic whiteboard included in the information processing system according to this embodiment is described below. FIG. 2 is a diagram illustrating a hardware configuration of an electronic whiteboard included in the information processing system in this embodiment.

As shown in FIG. 2, the electronic whiteboard 2 includes a central processing unit (CPU) 101 that controls the entire electronic whiteboard 2. In addition, the electronic whiteboard 2 includes a read only memory (ROM) 102 that stores a program used for driving the CPU 101 such as an initial program loader (IPL) etc. Furthermore, the electronic whiteboard 2 includes a random access memory (RAM) 103 used as an work area for the CPU 101 and a solid state drive (SSD) 204 that stores various data such as a program for the electronic whiteboard 2 etc. In addition, the electronic whiteboard 2 includes a network controller 105 that controls communication with the communication network 9 and an external storage controller 106 that controls communication with the USB memory 5.

In addition, the electronic whiteboard 2 includes a capturing device 111 that captures a still image or video displayed on the display of the notebook PC 6 and a graphics processing unit (GPU) 112 dedicated to graphics processing. Furthermore, the electronic whiteboard 2 includes a display controller 113 that controls displaying the screen to output images that the GPU 112 outputs to the display 3 and the videoconference terminal 7.

In addition, the electronic whiteboard 2 includes a touch sensor 115 that detects that the electronic stylus 4 or the user hand H etc. touches the display 3 and a sensor controller 114 that controls operating the touch sensor 115. The touch sensor 115 inputs and detects coordinates using an infrared interception method. In inputting and detecting coordinates, first, two light receiving/illuminating devices located at both ends of the upper side of the display 3 illuminate multiple infrared beams in parallel with the display 3. Subsequently, the light that is reflected by the reflector located around the display 3 and returns along with the same light path that the light receiving/illuminating device illuminates the light is received. In this case, the light receiving/illuminating devices are located at both ends of upper side of the display 3. However, it is also possible to locate the light receiving/illuminating devices at four corners of the display 3.

The touch sensor 115 outputs identification (ID) of the infrared illuminated by the two light receiving/illuminating devices and intercepted by an object (e.g., the electronic stylus 4 or the user hand H etc.), and the sensor controller 114 specifies a coordinate position where the object touches the display 3. In the description below, all IDs are examples of the identification information.

In addition, the touch sensor 115 is not limited to the infrared interception method. For example, a touch panel using a capacitance method that specifies a touch position by detecting a change of capacitance and a touch panel using a resistance film method that specifies a touch position by detecting a change of voltage of two opposing resistance films can be considered. In addition, various detecting methods such as a touch panel using an electromagnetic-induction method that specifies a touch position by detecting electromagnetic induction generated by touching the display unit by the object etc. can be used.

In addition, the electronic whiteboard 2 includes an electronic stylus controller 116. The electronic stylus controller 116 communicates with the electronic stylus 4 and determines whether or not the pen tip or the pen bottom touches the display 3. It is possible that the electronic stylus controller 116 determines whether only the pen tip or the pen bottom but also a handgrip of the electronic stylus 4 or other parts of the electronic stylus touches the display 3 or not.

In the electronic whiteboard 2, a CPU 101, ROM 102, RAM 103, SSD 104, network controller 105, external storage controller 106, capturing device 111, GPU 112, sensor controller 114, and the electronic whiteboard controller 116 are connected with each other electrically. Those components are connected with each other via a bus line 120 such as a data bus etc. It is possible to store a program for the electronic whiteboard 2 in a computer-readable recording medium such as a CD-ROM etc. and distribute the program.

Figure 3:
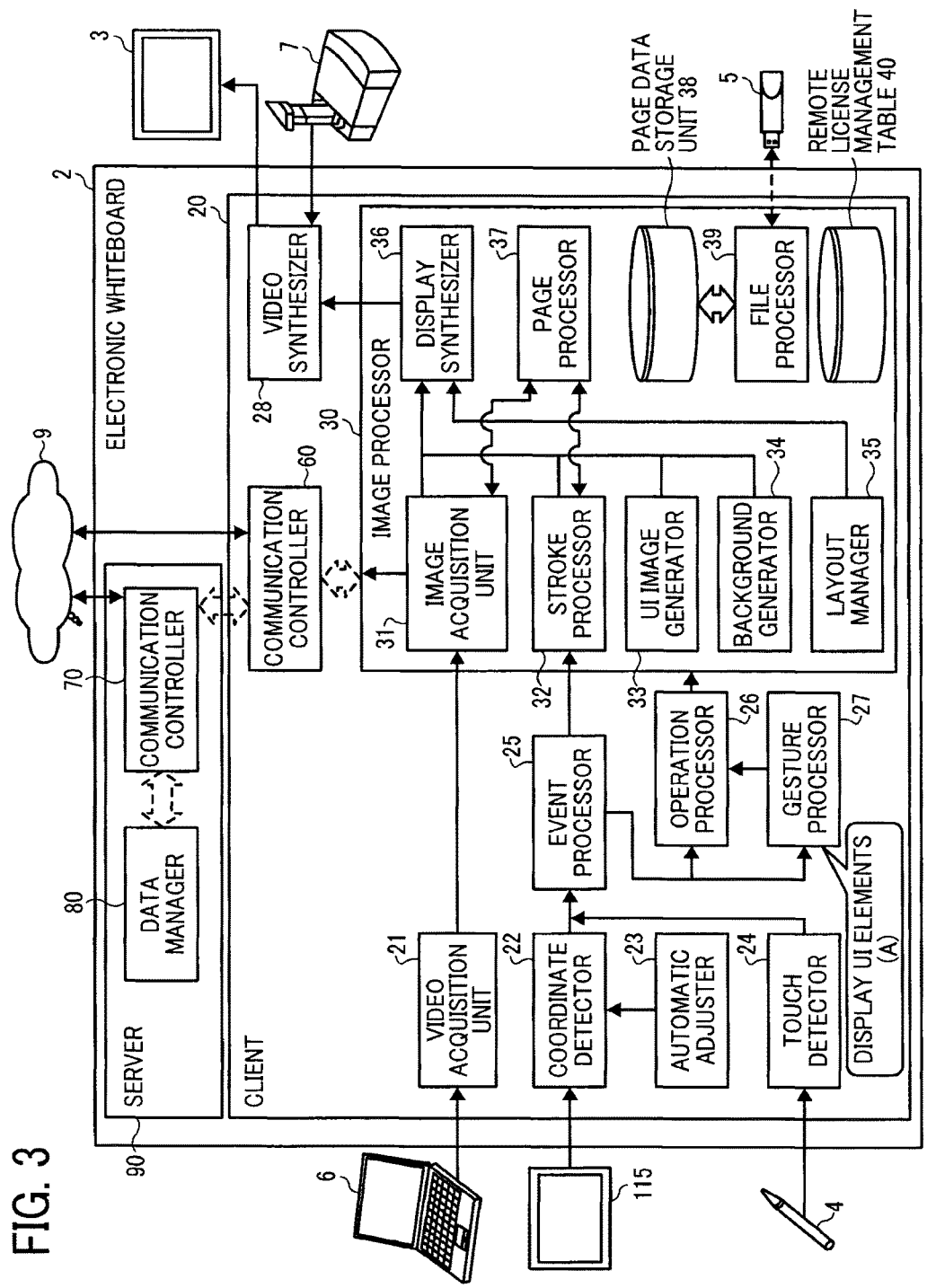
FIG. 3 is a diagram illustrating functional blocks of the electronic whiteboard included in the information processing system as an embodiment of the present invention.

Next, functional blocks of an electronic whiteboard included in the information processing system as a basis of this embodiment are described below. FIG. 3 is a diagram illustrating functional blocks of the electronic whiteboard included in the information processing system as a basis of this embodiment.

In the electronic whiteboard 2, the functional blocks shown in FIG. 3 are implemented by using the hardware configuration and program shown in FIG. 2. The electronic whiteboard 2 can be a host apparatus that firstly starts the remote sharing process and a client apparatus that later participates in the remote sharing process that had already been started. In addition, the electronic whiteboard 2 includes a client 20 and a server 90 as main functions. That is, the client 20 and the server 90 are included in the case of one electronic whiteboard 2.

The client 20 and the server 90 are implemented inside the case of one electronic whiteboard 2. If the electronic whiteboard 2 becomes the host apparatus, the client 20 and the server 90 are implemented in the electronic whiteboard 2. If the electronic whiteboard 2 becomes the client apparatus, the client 20 is implemented in the electronic whiteboard 2. However, the server 90 is not implemented in the electronic whiteboard 2.

That is, in FIG. 1, if the electronic whiteboard 2a becomes the host apparatus and the electronic whiteboard 2b becomes the client apparatus, the client 20 in the electronic whiteboard 2a communicates with the client 20 in the electronic whiteboard 2b via the server 90 implemented in the electronic whiteboard 2a. On the other hand, the client 20 in the electronic whiteboard 2b communicates with the client 20 in the electronic whiteboard 2a via the server 90 implemented in the electronic whiteboard 2a.

Next, a functional configuration of the client 20 is described below. The client 20 includes a video acquisition unit 21, a coordinate detector 22, an automatic adjuster 23, a touch detector 24, an event processor 25, an operation processor 26, a gesture processor 27, a video synthesizer 28, an image processing 30, and a communication controller 60.

Among these components, the video acquisition unit 21 acquires video output by video output apparatuses such as the notebook PC 6 etc. connected to the cable 10. The video acquisition unit 21 receives an image signal from the video output apparatus (e.g., the notebook PC 6 etc.). Subsequently, the image signal is analyzed, and image information such as a resolution of image frames as a display image of the video output apparatus formed by the image signal and/or an update frequency of the image frames etc. are extracted and output to the image acquisition unit 31.

The coordinate detector 22 detects a coordinate position of an event (e.g., an action that the user hand H touches the display 3 etc.) on the display 3 generated by user operation. In addition, the coordinate detector 22 detects an area touched by user operation.

The automatic adjuster 23 starts up when the electronic whiteboard 2 starts up and adjusts parameters for processing an image by a sensor camera using a light sensor method by the touch sensor 115 so that the touch sensor 115 can output appropriate values to the coordinate detector 22. The touch detector 24 detects an event (e.g., an action that the pen tip or the pen bottom of the electronic stylus 4 touches the display 3 etc.) generated by user operation.

The event processor 25 distributes the coordinate position of the event detected by the coordinate detector 22 and the detection result detected by the touch sensor 24 to each of a stroke processor 32, the operation processor 26, and the gesture processor 27 (described later).

The operation processor 26 operates various operations depending on events that the event processor 25 determines as UI operations in accordance with an UI element that the event is generated. Regarding the event that the event processor 25 determines as a gesture operation, the gesture processor 27 determines the content of the gesture using a coordinate history etc. and generates a gesture event. The gesture processor 27 executes an operation in accordance with the event that the event processor 25 determines as the gesture operation.

The image processor 30 superimposes each image layer etc. The image processor 30 includes an image acquisition unit 31, a stroke processor 32, an UI image generator 33, a background generator 34, and a layout manager 35. In addition, the image processor 30 includes a display synthesizer 36, a page processor 37, a page data storage unit 38, a file processor 39, and a remote license management table 40.

Among these components, the image acquisition unit 31 acquires each frame as an image from the video acquired by the video acquisition unit 21. The image corresponds to an image output by the video output apparatus (the notebook PC 6 etc.). The stroke processor 32 draws an image, deletes the drawn image, and edits the drawn image based on the event regarding the stroke drawing distributed by the event processor 25. The image by the stroke drawing corresponds to a stroke image.

The UI image generator 33 generates an UI image preset to the electronic whiteboard 2. The UI image corresponds to an UI image. The background generator 34 receives media data from the page processor 37 among page data that the page processor 37 reads from the page data storage unit 38.

The background generator 34 outputs the received media data to the display synthesizer 36. The image using the media data corresponds to a background image. Patterns of the background image are solid and a grid pattern etc.

The layout manager 35 manages layout information indicating a layout of each image output by the image acquisition unit 31, the stroke processor 32, the UI image generator 33, and the background generator 34 for the display synthesizer 36. As a result, the layout manager 35 can command the display synthesizer 36 to display or not to display the output image and the stroke image at which position in the UI image and the background image.

The display synthesizer 36 layouts each image output by the image acquisition unit 31, the stroke processor 32, the UI image generator 33, and the background generator 34 based on the layout information output by the layout manager 35.

The page processor 37 combines data of the stroke image and data of the output image into one page data and stores the page data in the page data storage unit 38. The data of the stroke image constructs a part of the page data as stroke layout data (each stroke data) indicated by a stroke layout data ID. The data of the output image constructs a part of the page data as media data indicated by a media data ID. In addition, after being read from the page data storage unit 38, the media data is dealt with data of the background image.

In addition, the page processor 37 transfers the media data among the page data stored temporarily to the display synthesizer 36 via the background generator 34 so that the video synthesizer 38 can display the background image on the display 3 again. In addition, the page processor 37 returns the stroke layout data (each stroke data) among the page data to the stroke processor 32 so that the stroke can be reedited. Furthermore, the page processor 37 can delete and edit the page data.

That is, when the page processor 37 stores the page data in the page data storage unit 38, the data of the output image displayed on the display 3 is stored in the page data storage unit 38 temporarily. Subsequently, in being read from the page data storage unit 38, the data is read as the media data that indicates the background image. After that, the page processor 37 outputs the stroke layout data that indicates the stroke image among the page data read from the page data storage unit 38 to the stroke processor 32. In addition, the page processor 37 outputs the media data that indicates the background image among the page data read from the page data storage unit 38 to the background generator 34.

The display synthesizer 36 superimposes the output image from the image acquisition unit 31, the stroke image from the stroke processor 32, and the UI image from the UI image generator 33 on the background image from the background generator 34 in accordance with the layout specified by the layout manager 35.

The page data storage unit 38 stores the page data. The page data is data (stroke layout data (each stroke data) and media data) (stroke data and image data) for one page displayed on the display 3.

The remote license management table 40 manages license data required to execute the remote sharing process. In the remote license management table 40, a product ID of the electronic whiteboard 2, a license ID for authentication, and an expiration date of the license are managed associated with each other.

Figure 4:
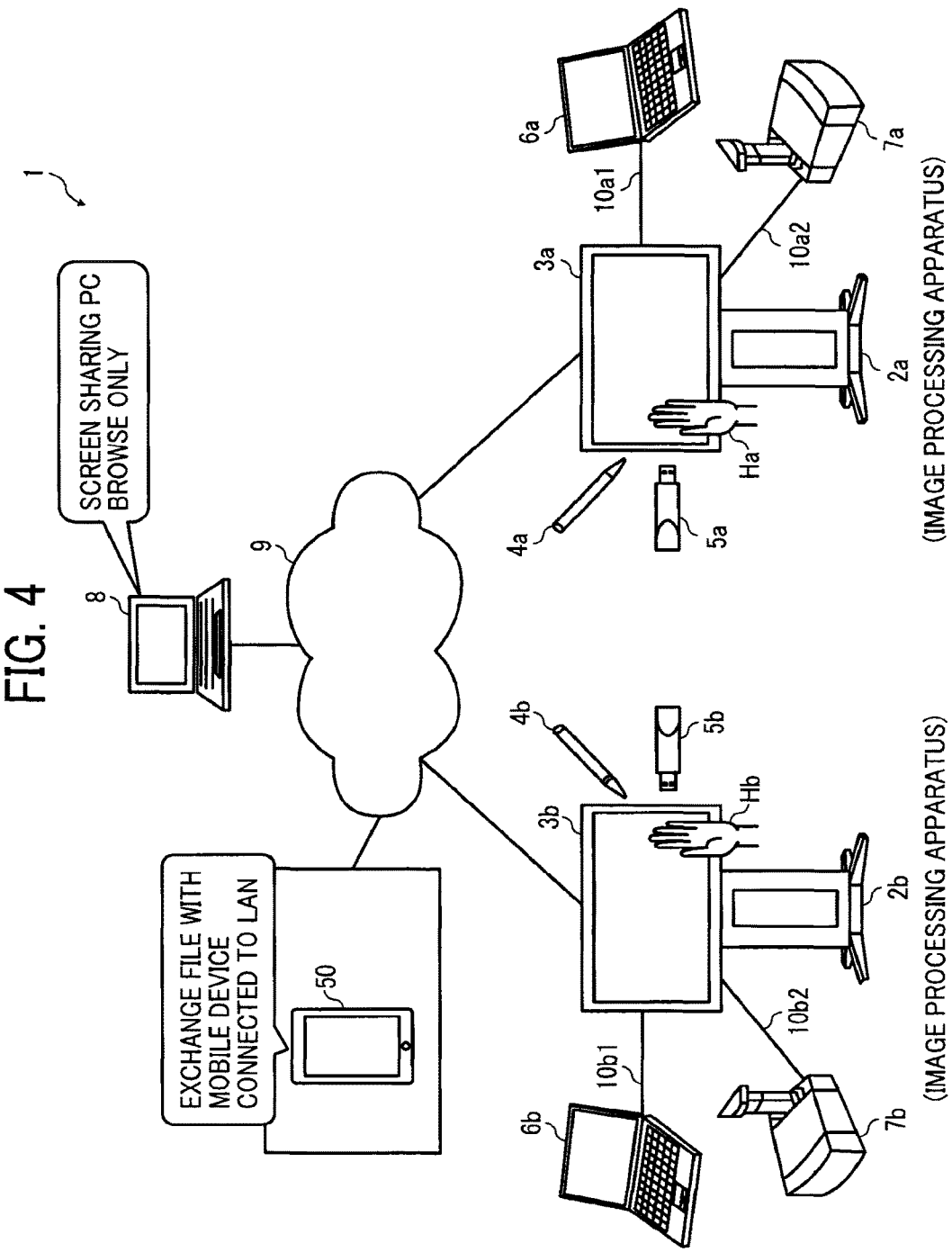
FIG. 4 is a diagram illustrating an entire configuration of an information processing system as an embodiment of the present invention.

Next, an entire configuration of the information processing system in this embodiment is described below. FIG. 4 is a diagram illustrating an entire configuration of the information processing system in this embodiment. Basically, while the entire configuration shown in FIG. 4 is almost similar to the entire configuration shown in FIG. 1, the different point is that a mobile device 50 connected to the LAN can communicate with the electronic whiteboard 2 via the communication network 9 in FIG. 4.

In addition, on the display 3, as described later, a pass code (an authentication code) constructed by random numbers may be displayed if security is configured in exchanging files between the mobile device 50 and the electronic whiteboard 2. That is, a difference code, which is randomly created, is set to the pass code (authentication code) every time the application program of the electronic whiteboard 2 executes.

By using the mobile device 50, it is possible to transfer a file created by the mobile device 50 to the electronic whiteboard 2 via the communication network 9. In addition, it is possible to receive a file displayed on the electronic whiteboard 2 by the mobile device 50 via the communication network 9. The hardware configuration of the electronic whiteboard 2 is the same as the configuration described in FIG. 2, and the detailed description is omitted.

Figure 5:
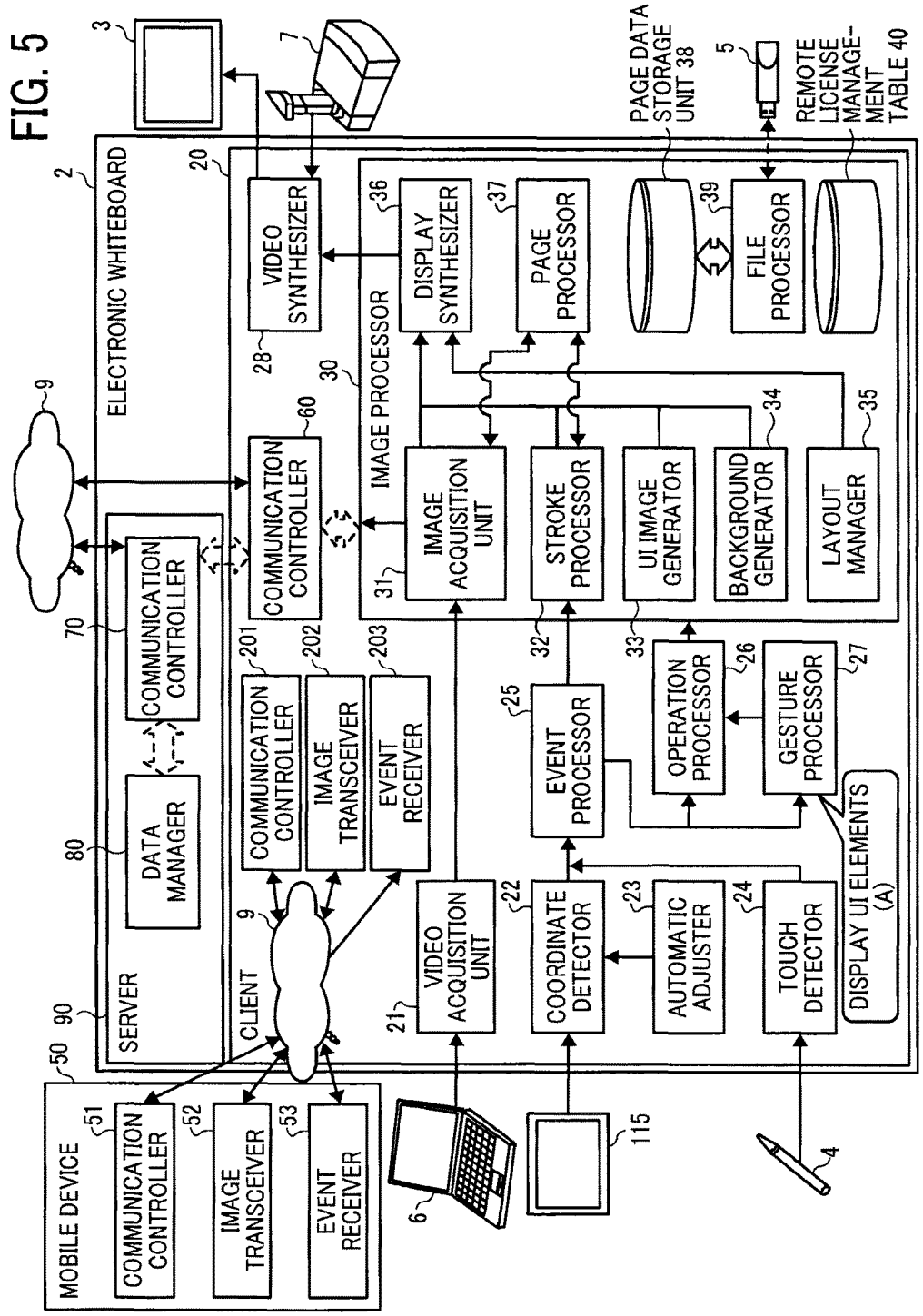
FIG. 5 is a diagram illustrating functional blocks of a mobile device and the electronic whiteboard included in the information processing system as an embodiment of the present invention.

Next, functional blocks of the mobile device and the electronic whiteboard included in the information processing system in this embodiment is described below. FIG. 5 is a diagram illustrating functional blocks of the mobile device and the electronic whiteboard included in the information processing system in this embodiment. The functional blocks of the electronic whiteboard is basically similar to the functional blocks of the electronic whiteboard described in FIG. 3. In this embodiment, a block that electronic whiteboard 2 exchanges signals with each block in the mobile device 50 to be communicable via the communication network 9 is added to the client 20.

In the client 20, a communication controller 201, an image transceiver 202, and an event receive 203 are added. In addition, the mobile device 50 includes a communication controller 51, an image transceiver 52, and an event receiver 53. As described later, when the mobile device 50 communicates with the electronic whiteboard 2 via the communication network, the communication controller 51 in the mobile device 50 and the communication controller 201 in the client 20 control the entire communication. After establishing the communication between the mobile device 50 and the electronic whiteboard 2, image data and image files etc. are exchanged between the image transceiver 52 in the mobile device 50 and the image transceiver 202 in the client 20. In addition, events generated by the mobile device 50 are received by the event receiver 53, and events generated by the electronic whiteboard 2 are received by the event receiver 203.

Figure 6:
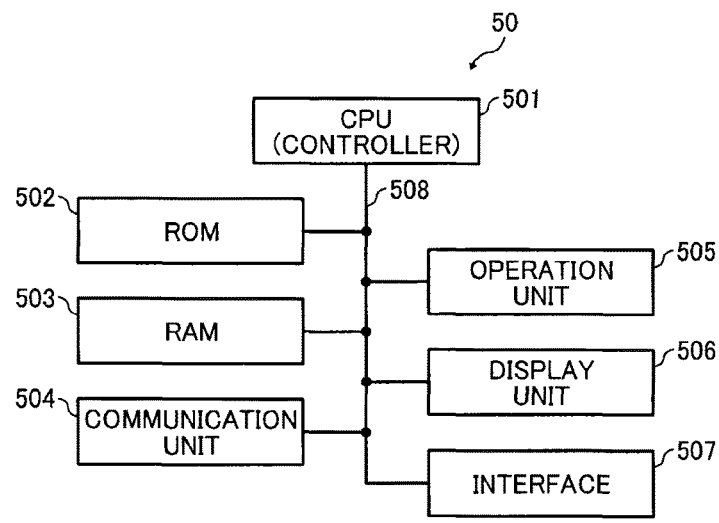
FIG. 6 is a block diagram illustrating a hardware configuration of the mobile device included in the information processing system as an embodiment of the present invention.

Next, a hardware configuration of the mobile device that constructs the information processing system in this embodiment is described below. FIG. 6 is a block diagram illustrating a hardware configuration of the mobile device included in the information processing system in this embodiment.

As shown in FIG. 6, the mobile device 50 includes a CPU 501 as the hardware configuration that controls the entire mobile device 50. In addition, storage units such as a ROM 502 and a RAM 503 that store various data and various programs etc. are included. The CPU 501 loads a control program stored in the ROM 502 and expands various data acquired through operations of the mobile device 50 into the RAM 503. Furthermore, a communication unit 504 that performs standard wireless communication using an antenna and short-range wireless communication such as NFC etc. (described later).

In addition, the mobile device 50 includes an operation unit 505 constructed by a keyboard etc. that commands the mobile device 50 by user operation and a display unit 506 constructed by a liquid crystal display (LCD) etc. Furthermore, an interface 507 constructed by a microphone and a speaker etc. is included. It should be noted that it is possible that the operational unit 505 is a software keys located on a touch panel display of the display unit 506. In addition, the CPU 501, the ROM 502, the RAM 503, the communication unit 504, the operation unit 505, the display unit 506, and the interface 507 are connected with each other via a bus 508.

Here, short-range wireless communication technology such as NFC used widely in mobile devices, office apparatuses, and public transportation infrastructure recently is briefly described below. Generally speaking, the technology is called as RFID, and that is a technology that performs individual authentication and individual recognition using radio waves. Among them, NFC is the technology that is considered to be most frequently used. This is a short-range wireless communication technology using a frequency band of 13.56 MHz, and the communication range is equal to or less than 10 cm.

Recently, NFC is implemented in mobile devices such as smartphones and tablet PCs etc. and is used for purposes such as payment and individual authentication etc. In the NFC technology, there are readers and/or writers that can read and/or write data actively and NFC tags that stores written data and is scanned by the reader and/or writer only.

Figure 7:
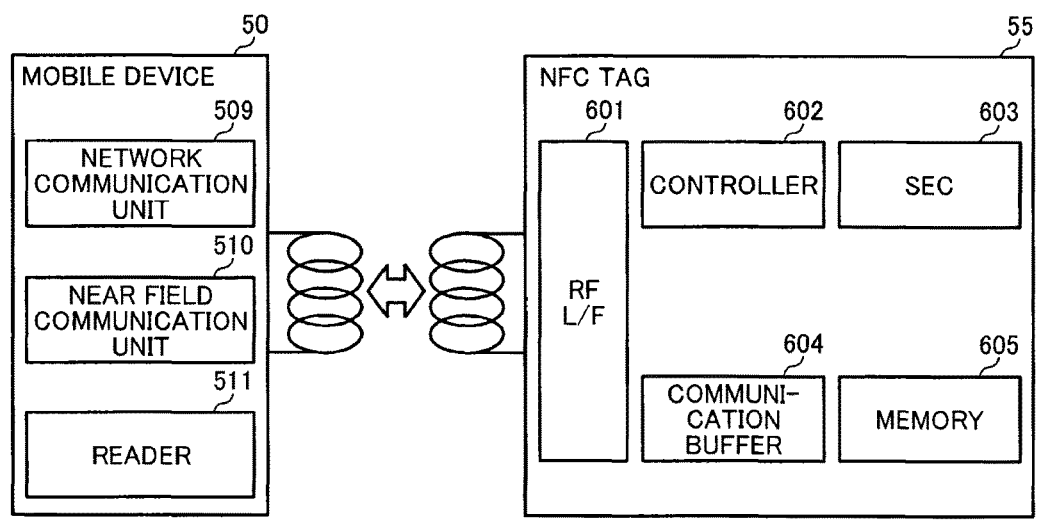
FIG. 7 is a diagram illustrating a schematic configuration of a Radio Frequency Identifier (RFID) (Near Field Communication (NFC)) included in the information processing system as an embodiment of the present invention.

Next, a basis schematic configuration of the RFID (NFC) included in the information processing system in this embodiment is described below. FIG. 7 is a diagram illustrating a basis schematic configuration of the RFID(NFC) included in the information processing system in this embodiment.

The mobile device 50 includes a near field communication unit 510 that performs the near field communication with the NFC tag via the communication unit 504 and a reader 511 that reads address information (e.g., IP address) of the electronic whiteboard 2 stored in a memory 605 of a NFC tag 55 and stores the address information. Here, the near field communication unit 510 functions as a first communication unit (a first communication circuit). In addition, a network communication unit 509 that accesses the electronic whiteboard 2 using the address information after scanning the address information of the electronic whiteboard 2 is included. The network communication unit 509 functions as a second communication unit (a second communication circuit).

The NFC tag 55 includes a Radio Frequency (RF) interface (I/F) 601, a controller 602 that controls the entire NFC tag 55, and a communication buffer 604 that exchanges data with the mobile device 50. In addition, the NFC tag 55 includes a memory 605 that stores data and a security (SEC) 605 for keeping security such as data encryption etc.

The mobile device 50 and the NFC tag 55 communicate with each other generating electromotive force by electromagnetic induction using the antenna. The mobile device 50 always generates a magnetic field, the electromagnetic induction occurs by getting closer to a passive tag of the NFC tag 55 to generate electromotive force in the NFC tag 55, and the electric power drives the NFC tag 55 to transfer data if necessary.

Generally speaking, the NFC tag 55 stores authentication data (e.g., IDs) required for communication and information that enables communication between devices (e.g., address and security data etc.). In this embodiment, in the memory 605 of the NFC tag 55, the address information such as IP address of the electronic whiteboard 2 that the mobile device is going to exchange a file is written as an example. In addition, the NFC tag 55 is located at a location where it is possible to perform the near field communication with the mobile device 50.

Figure 8:
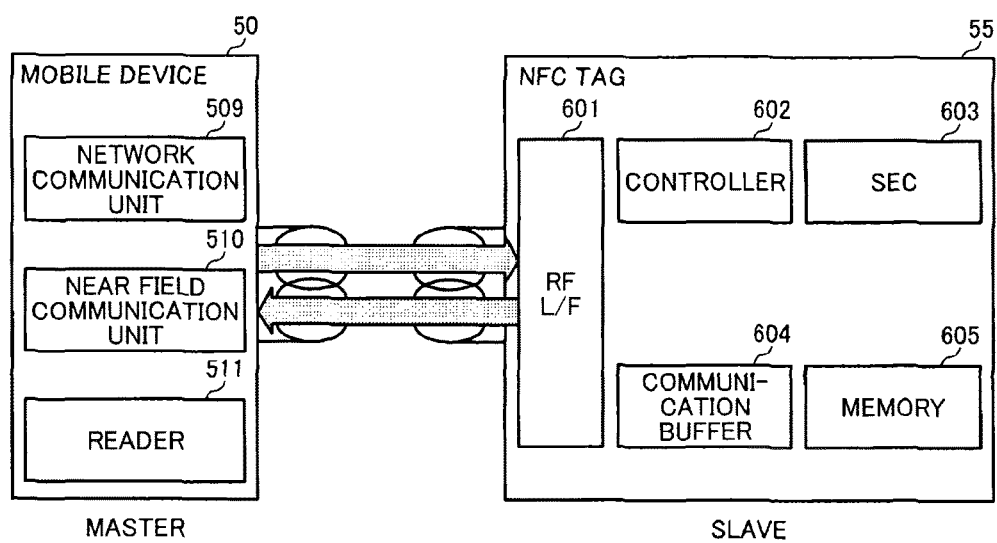
FIG. 8 is a diagram illustrating operation of controlling communication using the NFC included in the information processing system as an embodiment of the present invention.

Next, a communication method using the NFC included in the information processing system in this embodiment is described below. FIG. 8 is a diagram illustrating a communication method using the NFC included in the information processing system in this embodiment.

Basically, the mobile device 50 becomes a master apparatus and controls all communication. The NFC tag 55 becomes a slave apparatus and responds in accordance with accesses from the master apparatus. The NFC tag 55 is called as a passive tag. The NFC tag 55 only responds to requests from the master apparatus and never operates actively. The magnetic field is generated by the master apparatus.

Figure 9:
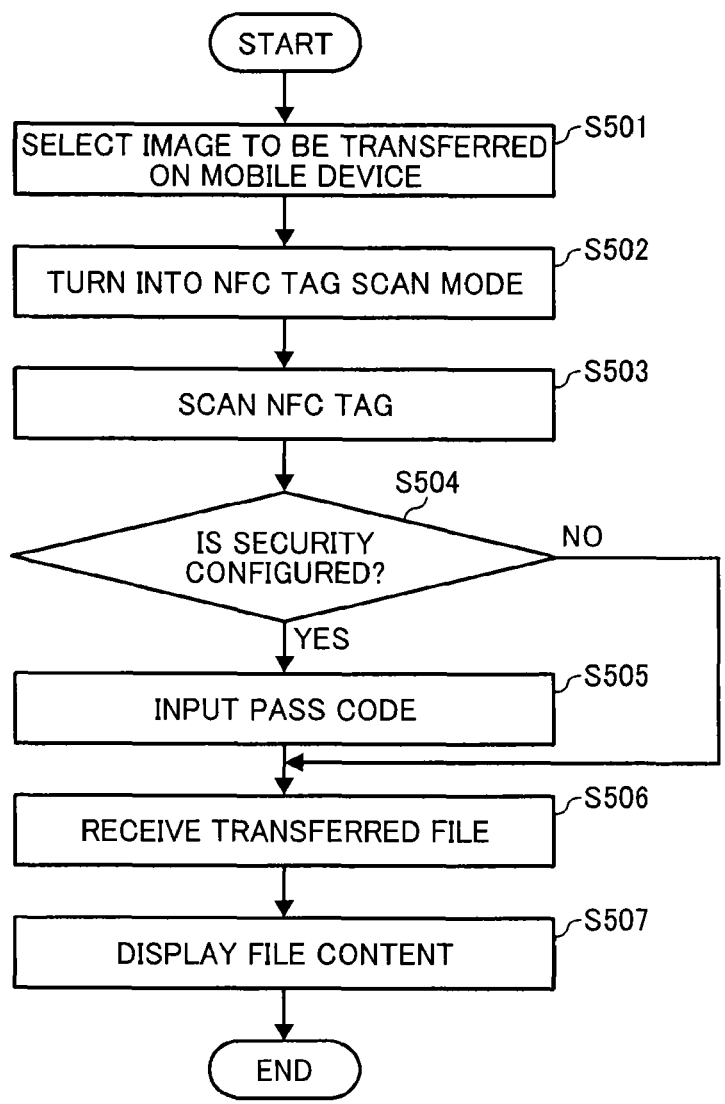
FIG. 9 is a flowchart illustrating an operation of the information processing system as an embodiment of the present invention.

Next, an operation of the information processing system in this embodiment is described below. FIG. 9 is a flowchart illustrating an operation of the information processing system in this embodiment that the mobile device transfers a file to the electronic whiteboard.

When the mobile device 50 transfers a file to the electronic whiteboard 2, first, in the mobile device 50, an application program for operating the electronic whiteboard 2 is executed. Subsequently, in the application program, a mode that transfers a file to the electronic whiteboard 2 is selected.

In S501, an image to be transferred from the mobile device 50 to the electronic whiteboard 2 is selected. In S502, the mobile device 50 is set to a NFC tag scanning mode. In S503, by holding the antenna over the NFC tag 55, the mobile device 50 performs the near field communication between the near field communication unit 510 and the NFC tag 55. Subsequently, the reader 511 reads the address information (e.g., IP address) of the electronic whiteboard 2 from the memory 605 of the NFC tag 55 and stores the address information.

In S504, the network communication unit 509 accesses the electronic whiteboard 2 corresponding to the address scanned from the mobile device 50 and determines whether or not the security is configured. If it is determined that the security is configured (YES in S504), the step proceeds to S505. If it is determined that the security is not configured (NO in S504), the step proceeds to S506.

In S505, since the security is configured, it is required to input the pass code. Therefore, when the network communication unit 509 accesses the electronic whiteboard 2, the pass code displayed on the display 3 of the electronic whiteboard 2 is input. In S506, the network communication unit 509 reads a file of an image to be transferred selected in S501. Subsequently, in S507, network communication unit 509 transfers the file read in S506 to the electronic whiteboard 2 via the communication network 9. After that, the electronic whiteboard 2 displays a content of the file on the display 3.

Figure 10:
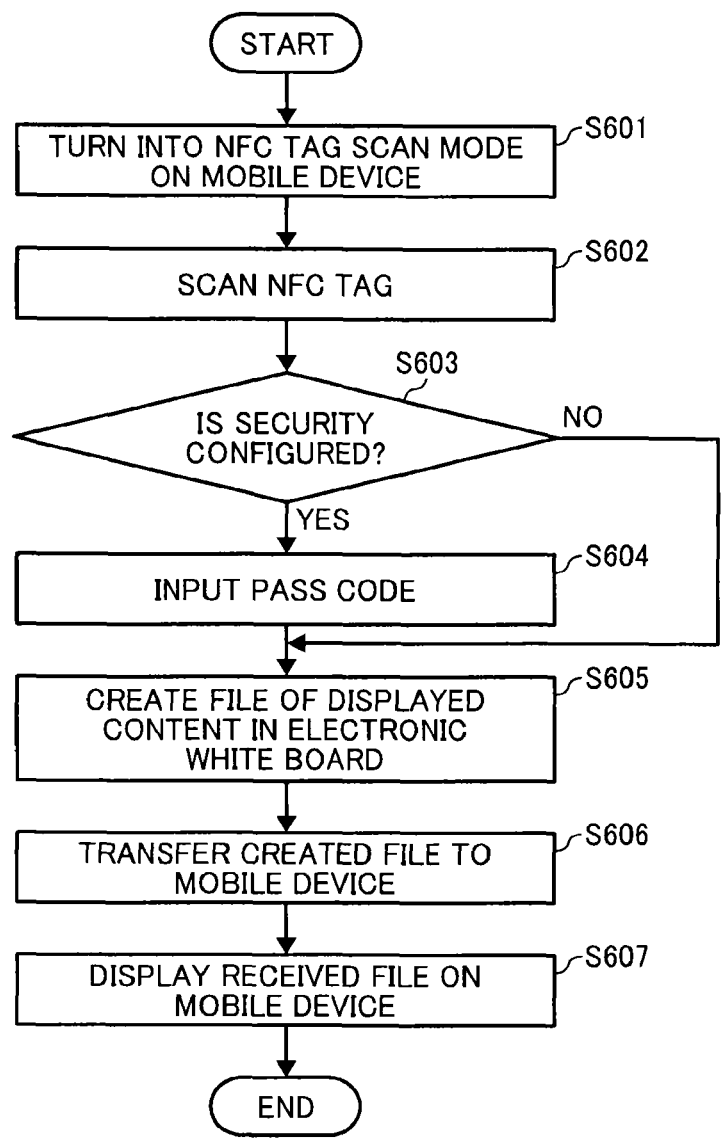
FIG. 10 is a flowchart illustrating an operation of the information processing system as an embodiment of the present invention.

Next, another operation of the information processing system in this embodiment is described below. FIG. 10 is a flowchart illustrating an operation of the information processing system in this embodiment that the mobile device receives a file from the electronic whiteboard.

When the mobile device 50 receives a file from the electronic whiteboard 2, first, in the mobile device 50, an application program for operating the electronic whiteboard 2 is executed. Subsequently, in the application program, a mode that receives a file from the electronic whiteboard 2 is selected.

In S601, the mobile device 50 is set to a NFC tag scanning mode. In S602, by holding the antenna over the NFC tag 55, the mobile device 50 performs the near field communication between the near field communication unit 510 and the NFC tag 55. Subsequently, the reader 511 reads the address information (e.g., IP address) of the electronic whiteboard 2 from the memory 605 of the NFC tag 55 and stores the address information.

In S603, the network communication unit 509 accesses the electronic whiteboard 2 corresponding to the address scanned from the mobile device 50 and determines whether or not the security is configured. If it is determined that the security is configured (YES in S603), the step proceeds to S604. If it is determined that the security is not configured (NO in S603), the step proceeds to S605.

In S604, since the security is configured, it is required to input the pass code. Therefore, when the mobile device 50 accesses the electronic whiteboard 2, the pass code displayed on the display 3 of the electronic whiteboard 2 is input. In S605, for example, a file of the content displayed on the electronic whiteboard 2 is created in PDF file format.

In S606, the communication controller 201 in the electronic whiteboard 2 transfers the file created in S605 to the mobile device via the communication network 9. In S607, the content of the file received by the mobile device is displayed on the display unit of the mobile device.

It should be noted that operations of functional blocks that construct the information processing apparatus in this embodiment shown in FIGS. 9 and 10 can be executed by a program on a computer. That is, the CPU 101 in the electronic whiteboard 2 loads a program stored in the ROM 102 and the RAM 103, and the CPU 501 in the mobile device 50 loads a program stored in the ROM 502 and the RAM 503. Next, it is possible to implement the embodiment by executing each step of the program sequentially.

As described above, in this embodiment, the address information of the electronic whiteboard that exchanges files with the mobile device is written in the NFC tag, and the application program for operating the information processing apparatus is used on the mobile device. In addition, after launching the application program described above, the tag information of NFC is read using the mobile device.

Through the above-described operation, user registration to the electronic whiteboard completes, using the mobile device. Furthermore, if security is configured in exchanging files between the mobile device and the electronic whiteboard, a pass code (authentication code) is displayed on the electronic whiteboard by accessing the electronic whiteboard using the mobile device. By inputting the pass code in the mobile device, it is possible to exchange files between the mobile device and the electronic whiteboard. Therefore, preparations such as user registration or scan of authentication code that are conventionally required are unnecessary.

In the embodiment described above, the information processing apparatus can easily perform preparation before exchanging files with the electronic whiteboard.

For example, even in the case when the user wants to connect to the on-premise private cloud service, preparation for connection can be easily performed.

In the known technology, in registering a user who can use the on-premise private cloud service, it is required to register an account identified by a user identification (ID) and a password etc. to login the private cloud service preliminarily. It is required to access a web browser of the private cloud service and register the user to perform the registration. However, such operation is not necessary.

The present invention also encompasses a non-transitory recording medium storing a program that executes an information processing method. The information processing method includes the steps of communicating with a memory that stores address information of the image processing apparatus, reading the address information of the image processing apparatus from the memory, and exchanging data with the image processing apparatus identified with the address information read from the memory through a communication network.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus, comprising:
   a first communication circuit to communicate with a memory that stores address information of an image processing apparatus;
   circuitry to read the address information of the image processing apparatus from the memory; and
   a second communication circuit to exchange data with the image processing apparatus identified with the address information read from the memory through a communication network,
   wherein the circuitry further determines whether or not security is configured in exchanging of data with the image processing apparatus, and when the security is configured, the circuitry inputs an authentication code being displayed on the image processing apparatus to enable exchange of data with the image processing apparatus,
   wherein the authentication code is randomly generated every time an application program in the image processing apparatus executes.

2. The information processing apparatus according to claim 1, wherein the first communication circuit performs near field communication using Radio Frequency Identifier (RFID).

3. The information processing apparatus according to claim 1, wherein the address information is an IP address to be used for accessing the image processing apparatus.

4. An information processing system, comprising:
   an image processing apparatus; and
   a mobile device to exchange data with the image processing apparatus,
   wherein the mobile device includes:
      a first communication circuit to communicate with a memory that stores address information of an image processing apparatus;
      circuitry to read the address information of the image processing apparatus from the memory; and
      a second communication circuit to exchange data with the image processing apparatus identified with the address information read from the memory through a communication network,
   wherein the circuitry further determines whether or not security is configured in exchanging of data with the image processing apparatus, and when the security is configured, the circuitry inputs an authentication code being displayed on the image processing apparatus to enable exchange of data with the image processing apparatus, and
   wherein the authentication code is randomly generated every time an application program in the image processing apparatus executes.

5. A method of controlling communication with an image processing apparatus, comprising:
   communicating with a memory that stores address information of the image processing apparatus;
   reading the address information of the image processing apparatus from the memory; and
   exchanging data with the image processing apparatus identified with the address information read from the memory through a communication network, wherein the method further includes
   determining whether or not security is configured in exchanging of data with the image processing apparatus; and
   when it is determined that the security is configured, inputting an authentication code being displayed on the image processing apparatus to enable exchange of data with the image processing apparatus,
   wherein the authentication code is randomly generated every time an application program in the image processing apparatus executes.

* * * * *